(12) United States Patent
Zajkowski et al.

(10) Patent No.: US 7,506,804 B2
(45) Date of Patent: Mar. 24, 2009

(54) SYSTEM AND METHOD FOR AN INTEGRATED PAYMENT AND REWARD CARD

(75) Inventors: Joseph W. Zajkowski, Cedarburg, WI (US); Carolyn G. Tabat, Wind Lake, WI (US); Brad M. Sonnenberg, Lakeville, MN (US); Kenneth C. Hack, Dousman, WI (US); Anne M. Christenson, Plymouth, MN (US)

(73) Assignee: U.S. Bancorp Licensing, Inc., Minneapolis, MN (US)

( * ) Notice: Subject to any disclaimer, the term of this patent is extended or adjusted under 35 U.S.C. 154(b) by 245 days.

(21) Appl. No.: 11/139,217

(22) Filed: May 27, 2005

(65) Prior Publication Data

US 2006/0266821 A1    Nov. 30, 2006

(51) Int. Cl.
G06K 5/00 (2006.01)
(52) U.S. Cl. .................. 235/380; 235/379; 235/375
(58) Field of Classification Search .......... 235/380, 235/379, 375, 376; 705/14
See application file for complete search history.

(56) References Cited

U.S. PATENT DOCUMENTS

| | | | |
|---|---|---|---|
| 4,941,090 A | 7/1990 | McCarthy | |
| 5,117,355 A | 5/1992 | McCarthy | |
| 5,202,826 A | 4/1993 | McCarthy | |
| RE36,116 E | 2/1999 | McCarthy | |
| 6,024,288 A * | 2/2000 | Gottlich et al. | 235/493 |
| 6,388,608 B1 | 5/2002 | Woodell | |
| 6,601,771 B2 * | 8/2003 | Charrin | 235/492 |
| 6,980,973 B1 * | 12/2005 | Karpenko | 705/412 |
| 7,191,952 B2 * | 3/2007 | Blossom | 235/492 |
| 7,219,835 B2 * | 5/2007 | Graves et al. | 235/380 |
| 2001/0000814 A1 | 5/2001 | Montgomery et al. | |
| 2001/0039533 A1 * | 11/2001 | Pare et al. | 705/39 |
| 2002/0066783 A1 | 6/2002 | Sawin | |
| 2002/0070279 A1 | 6/2002 | Zausner | |
| 2002/0102975 A1 | 8/2002 | Allen | |
| 2002/0111909 A1 | 8/2002 | Lee | |
| 2002/0112236 A1 | 8/2002 | Sukeda et al. | |
| 2002/0133467 A1 | 9/2002 | Hobson et al. | |
| 2002/0138428 A1 | 9/2002 | Spear | |
| 2002/0152116 A1 | 10/2002 | Yan et al. | |
| 2002/0174016 A1 | 11/2002 | Cuervo | |
| 2002/0194124 A1 | 12/2002 | Hobbs et al. | |
| 2003/0001005 A1 | 1/2003 | Risafi et al. | |
| 2003/0028481 A1 | 2/2003 | Flitcroft et al. | |
| 2003/0033246 A1 | 2/2003 | Slater | |
| 2003/0053609 A1 | 3/2003 | Risafi et al. | |
| 2003/0055782 A1 | 3/2003 | Slater | |
| 2003/0064798 A1 | 4/2003 | Grauzer et al. | |
| 2003/0069846 A1 * | 4/2003 | Marcon | 705/41 |
| 2003/0075610 A1 * | 4/2003 | Ong | 235/492 |
| 2003/0088462 A1 | 5/2003 | Carrithers et al. | |

(Continued)

Primary Examiner—Karl D. Frech
(74) Attorney, Agent, or Firm—Foley & Lardner LLP (57) ABSTRACT

An integrated rewards card includes a credit card number associated with a credit account of a person, persons, entity or a business. The integrated rewards card also includes a debit card number. The debit card number is different then the credit card number. Purchases using the credit card number cause a reward balance on a reward account associated with the debit card number to be increased. Products or services can be purchased with the reward account using a point of sale device for the credit card number.

20 Claims, 5 Drawing Sheets

U.S. PATENT DOCUMENTS

| | | |
|---|---|---|
| 2003/0094761 A1 | 5/2003 | Furuta et al. |
| 2003/0111527 A1* | 6/2003 | Blossom ..................... 235/380 |
| 2003/0135462 A1 | 7/2003 | Brake, Jr. et al. |
| 2003/0197058 A1 | 10/2003 | Benkert et al. |
| 2003/0229584 A1 | 12/2003 | Brown |
| 2003/0236704 A1 | 12/2003 | Antonucci |
| 2004/0006537 A1 | 1/2004 | Zelechoski et al. |
| 2004/0024672 A1 | 2/2004 | Brake, Jr. et al. |
| 2004/0039694 A1 | 2/2004 | Dunn et al. |
| 2004/0044577 A1 | 3/2004 | Sisko et al. |
| 2004/0068438 A1 | 4/2004 | Mitchell et al. |
| 2004/0073480 A1 | 4/2004 | Nahmias |
| 2004/0110557 A1 | 6/2004 | Rowe |
| 2004/0118930 A1 | 6/2004 | Berardi et al. |
| 2004/0122762 A1 | 6/2004 | Li |
| 2004/0140361 A1 | 7/2004 | Paul et al. |
| 2004/0143527 A1 | 7/2004 | Benkert et al. |
| 2004/0148200 A1 | 7/2004 | Hodges |
| 2004/0164490 A1 | 8/2004 | Glass |
| 2004/0195316 A1 | 10/2004 | Graves et al. |
| 2004/0205023 A1 | 10/2004 | Hafer et al. |
| 2004/0215505 A1 | 10/2004 | Sullivan |
| 2004/0238620 A1 | 12/2004 | Cohagan et al. |
| 2004/0238622 A1 | 12/2004 | Freiberg |
| 2005/0004866 A1 | 1/2005 | Bonalle et al. |
| 2005/0020337 A1 | 1/2005 | Simmons |
| 2005/0021400 A1* | 1/2005 | Postrel ........................ 705/14 |
| 2005/0033688 A1 | 2/2005 | Peart et al. |
| 2005/0038701 A1 | 2/2005 | Matthew |
| 2005/0038740 A1 | 2/2005 | Ogilvie |
| 2005/0049964 A1 | 3/2005 | Winterer et al. |
| 2005/0057633 A1 | 3/2005 | Meyerhofer |
| 2005/0058482 A1 | 3/2005 | Meyerhofer |
| 2005/0065848 A1 | 3/2005 | Mitchell et al. |
| 2005/0065849 A1 | 3/2005 | Mitchell et al. |
| 2005/0065850 A1 | 3/2005 | Mitchell et al. |
| 2005/0077350 A1 | 4/2005 | Courtion et al. |
| 2005/0086167 A1 | 4/2005 | Brake, Jr. et al. |
| 2005/0125343 A1* | 6/2005 | Mendelovich ................ 705/39 |
| 2005/0133590 A1* | 6/2005 | Rettenmyer et al. ......... 235/380 |
| 2006/0131396 A1* | 6/2006 | Blossom ..................... 235/380 |
| 2006/0195359 A1* | 8/2006 | Robinson et al. ............. 705/14 |
| 2006/0249575 A1* | 11/2006 | Turner et al. ................. 235/380 |

* cited by examiner

SYSTEM AND METHOD FOR AN INTEGRATED PAYMENT AND REWARD CARD

FIELD OF THE INVENTION

The present application relates generally to payment systems, cards and methods. More particularly, the present application relates to payment systems that use reward accounts, payment methods that use reward accounts and/or payment cards that use reward accounts.

BACKGROUND OF THE INVENTION

Payment systems typically utilize a payment card (e.g., a conventional credit and debit card). A payment card is generally a piece of plastic material bearing financial information (e.g., credit and debit card numbers) that can be processed to pay for goods or services. Types of payment cards include a credit or debit card, such as those utilizing Visa®, Mastercard®, and American Express® networks. The payment card is issued by a card issuer (e.g., a bank) to a cardholder (e.g., a customer) who uses the card to purchase goods and services.

According to U.S. Patent Application Publication No. 2005/0077350, combination credit/debit cards were developed in the 1990s. To purchase goods or services, a cardholder clerk swipes or otherwise processes the credit/debit card through a point of sale (POS) device (e.g., card reader). The POS device communicates with an open network such as a VISA network.

Financial information obtained from the process is transmitted through the open network and causes a charge to appear either on a credit account or a bank account to pay for the purchased product. Given the pervasiveness of charge cards, credit cards, debit cards, credit/debit cards, and other payment cards, the financial transaction interchange to which charge cards, credit cards, debit cards and credit/debit cards belong can be considered an open network.

U.S. Patent Application Publication No. 2004/0238622 describes that the payment card issuer prefers that the cardholders predominantly use the issuer's payment card (e.g., a credit card) in order to generate the largest amount of fees and revenue. Therefore, the credit card issuer often offers incentives to cardholders who use the issuer's card. The incentives or rewards are accumulated in an account when the cardholder uses the card. The use of incentives benefits the card issuer because the opportunity for the credit card issuer to generate fees and revenue comes with credit card usage. For example, the incentive may be a certain amount of frequent flyer miles, cash, credit towards purchases, points, gifts, etc. These incentives are vigorously promoted by banks and/or card issuing organizations.

Credit and debit cards are being issued by banks and financial institutions in association with other commercial companies or businesses which themselves offer goods and/or services. This phenomena, known as co-branding, provides a credit and/or debit card that often carries a name of the commercial company along with the issuer's name. The commercial company often provides the credit or debit card holder certain benefits which are typically related to the goods or services provided by that commercial company. An example of a co-branded payment card is the General Motors® credit card (Mastercard or Visa) which offers credit card holders 5% of earnings on card purchases toward the purchase or lease of a new General Motors vehicle. The 5% of earnings are accumulated in a rewards account.

Heretofore, payment card rewards have required that the cardholder obtain a payment coupon or certificate once a particular number of reward points were accumulated. Alternatively, other reward programs have required that cardholder call, write and/or otherwise request a certificate or coupon for purchasing a particular product. For example, frequent flyer award programs associated with the credit cards require the cardholder to call the airline and provide a frequent flier number to obtain a ticket based upon frequent flier miles. Other payment card reward systems require that the card holder provides card number information to a web-based redemption site for goods and services in exchange for reward points.

Using coupons, vouchers, gift cards and the like are inconvenient because they require that the customer carry yet another card or papers. Additionally, gift cards, vouchers and coupons require that new codes and account numbers be generated for the transaction. Further, the redeeming store or dealer is inconvenienced by the use of coupons, vouchers, and gift cards because a separate redemption process (separate from the credit card process) is required to authorize the transaction. The separate process requires additional in-store training and separate reimbursement procedures.

U.S. Patent Application Publication No. 2005/0077350 provides a system in which rewards or award points can be redeemed using an automated system. U.S. Publication No. 20051/0077350 discloses a closed network for redeeming award points. However, a closed network requires an additional cost and training for providers of the services.

Thus, there is a need for a payment card system that facilitates easy access to redeeming rewards at participating stores, dealers, outlets or service providers. Further, there is a need for a credit card or debit card system that includes a debit card number (or an additional debit card number) that is operable on existing networks for redeeming reward balances. Yet further, there is a need for an open network for redeeming reward balances. Yet further still, there is a need for a payment card optimized for easy redemption of rewards from the merchant's, card issuer's and/or card user's perspective.

SUMMARY OF THE INVENTION

An exemplary embodiment relates to a financial system including an integrated credit/debit reward card including a payment card number associated with a payment account and a debit card number. The debit card number is different than the payment card number and is associated with a debit account. Purchases using the payment card increase the debit account based upon a reward scheme. The financial system also includes point of sale equipment for processing the payment card number and the debit card number. The payment card number and the debit card number are processed utilizing the same network.

Another embodiment relates to a method of procurement using a payment card. The payment card has a debit card number associated with a first account. The payment card also includes a second number associated with a second account. Use of the second number to purchase goods or services may result in an accumulation in the first account. The method includes providing the payment card to a merchant, determining whether to use the first number or the second number to at least partially purchase a good or a service, and using a point of sale device to process the debit card number. The point of sale device is capable of processing the second number for purchases of goods or services. The method also includes consummating a transaction upon receiving verification.

Still another exemplary embodiment relates to an integrated rewards card. The integrated rewards card includes a payment card number associated with a payment account of a person, persons, an entity or a business. The integrated rewards card also includes a debit card number. The debit card number is different than the payment card number. Purchases using the payment card number cause a reward balance on a reward account associated with a debit card number to be increased. Products or services can be purchased with the reward account using a POS device for the payment card number.

BRIEF DESCRIPTION OF THE DRAWINGS

Exemplary embodiments of the present invention are described below with reference to the accompanying drawings, where in like numbers denote like elements and.

DETAILED DESCRIPTION OF EXEMPLARY EMBODIMENTS

Figure 1:
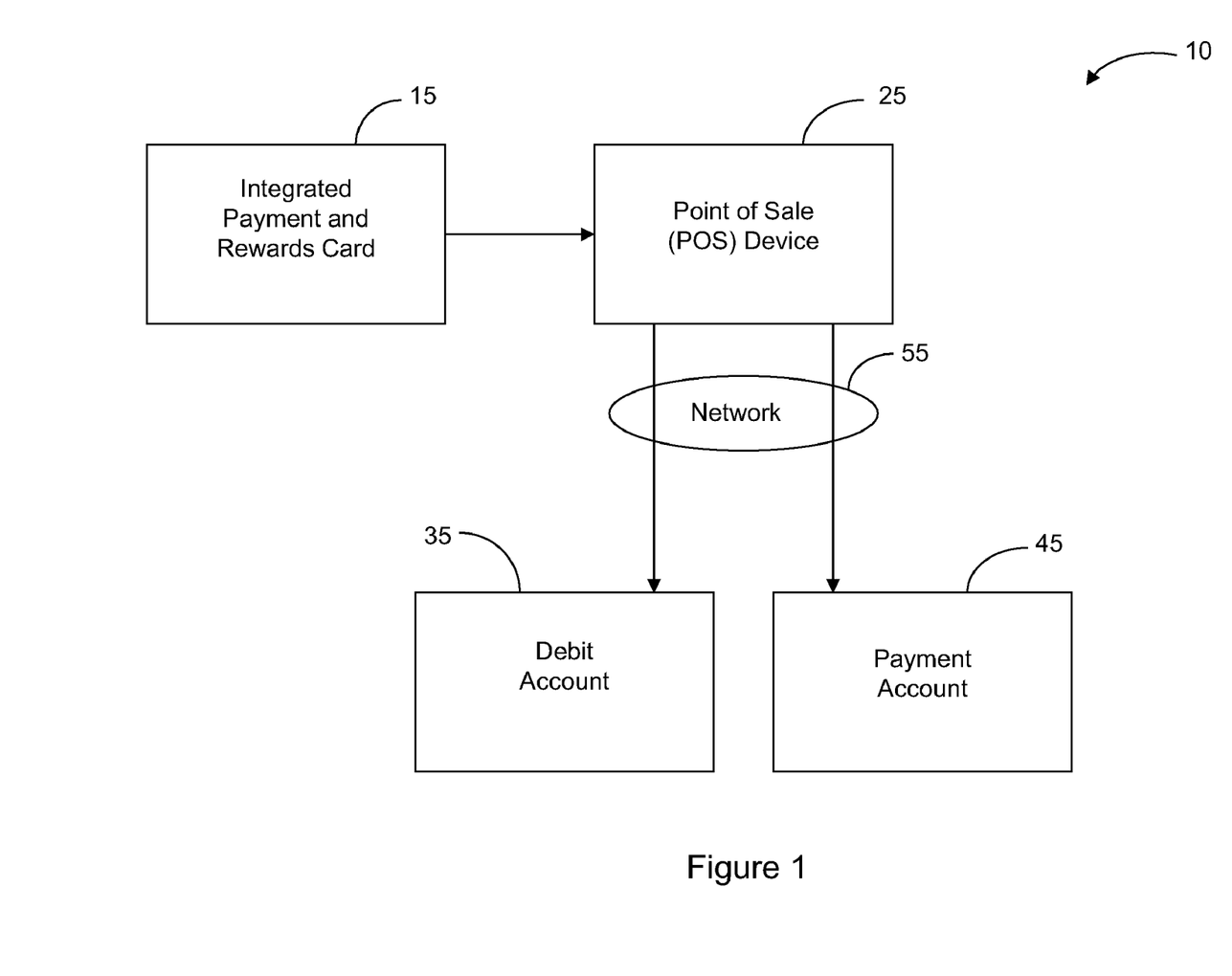
FIG. 1 is a general block diagram depicting a financial system in accordance with an exemplary embodiment.

FIG. 1 illustrates a financial information system 10 which is configured for procuring goods and services using a reward-type payment card infrastructure. Financial system 10 generally includes an integrated payment card 15, a point of sale device 25, a network 55, a debit account 35 and a payment account 45. Device 25 is preferably coupled to debit account 35 and payment account 45 through network 55. Although shown with two communication lines in FIG. 1, system 10 can utilize any communication system for accessing account 35 and 45.

Network 55 is preferably an open network for processing payment card transactions, such as credit and debit card transactions. Network 55 can involve a number of wide area networks (WANs), local area networks (LANs), servers, routers and other communication and computing components. Network 55 provides the infrastructure necessary for communication between device 25 and accounts 35 and 45.

Point of sale device 25 can be any type of device for processing payment card transactions (e.g., credit card and/or of debit card transactions). In one embodiment, point of sale device 25 can be a card reader device. Device 25 can include a key pad for entering information (e.g., numbers) on card 15. An exemplary device 25 is a T7P type POS device manufactured by Hypercom.

Figure 2:
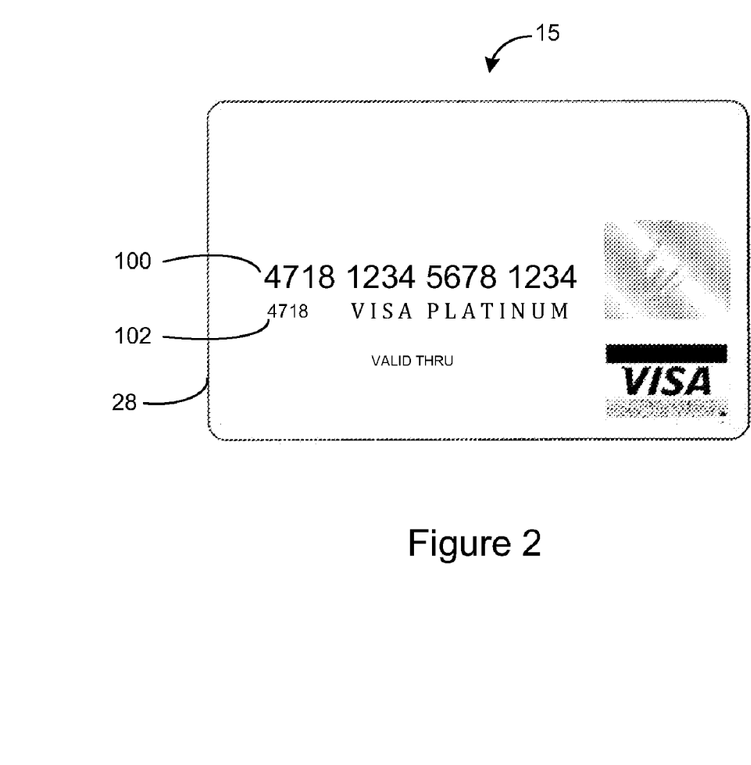
FIG. 2 is a top view drawing of a payment card for use in the financial system illustrated in FIG. 1.
Figure 3:
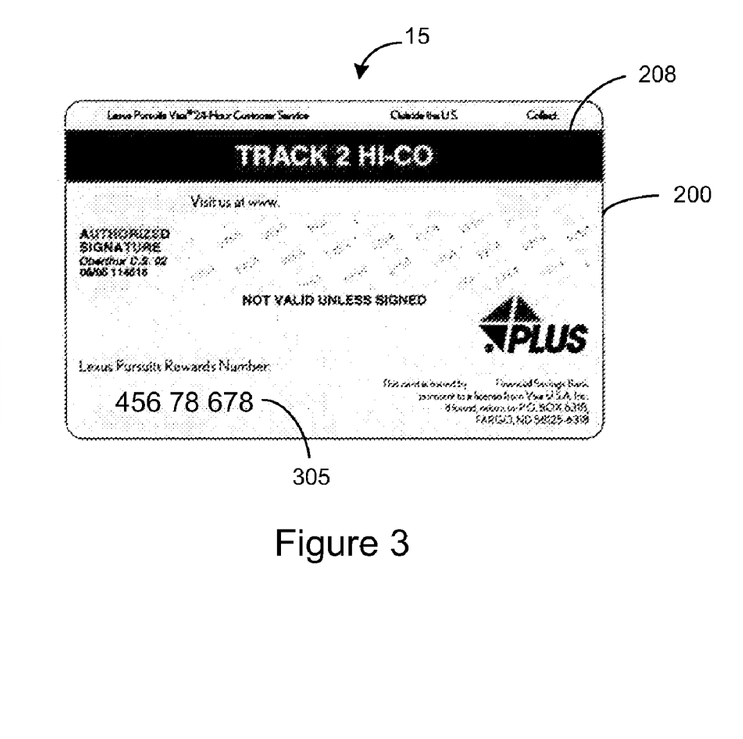
FIG. 3 is a bottom view drawing of the payment card illustrated in FIG. 2.

An exemplary payment card 15 is described with respect to FIGS. 2-3. Financial operations associated with such a card are described below with reference to FIGS. 4-6. The term payment card as used below refers to a card used for making purchases (e.g., a credit or debit card). Payment Card 15 can have any shape or size depending on design criteria and can be fabricated from any material without departing from the scope of the invention.

Financial system 10 can be implemented as a software application written in any language or technology (e.g., Cobol, JAVA, J2EE, or .Net) and supported on secured servers or other hardware. Network 55 can include a myriad of financial processing tools including security software, communication software, etc. Accounts 35 and 45 are preferably located in computing equipment (e.g., servers, networks, mainframes, etc.) operated or controlled by the card issuer. The card issuer's computing equipment communicates with the vendor and/or device 25 through network 55.

System 10 advantageously utilizes integrated payment and reward cards 15. Preferably, card 15 is embodied as a Visa or Mastercard credit card or debit card including novel debit card functionality against a reward balance. Card 15 is preferably configured to nearly seamlessly allow transactions based upon either of accounts 35 and 45.

Card 15 preferably includes indicia of the credit card number (for account 45) as well as at least partial indicia of the debit card number (for account 35). In one embodiment, card 15 includes a credit card number embossed on the front of card 15 and a debit card number printed on the back of card 15 in a non-embossed fashion, such as by spray printing. Preferably, the debit card number printed on the back of card 15 does not include the first four digits of the debit card number for security purposes. The first four digits can be the bank identification number (BIN) or a portion thereof.

The credit card number corresponds to the payment account 45 and the debit card number corresponds to the debit account 35. Use of the payment account 45 for purchasing goods or services results in accumulation in debit account 35 (e.g., a reward account, award account, etc.). According to a rewards scheme, additional points can be rewarded upon other bases, such as purchases from particular merchants. Debit account 35 can hold points, monetary value, or other indicia of rewards. In addition, cash, certificates or other financial instruments can be placed and accounted in debit account 35.

Debit account 35 preferably has a 16-digit debit account number. The debit account number can have a conventional VISA or Mastercard format. Similarly, payment account 45 has a 16-digit payment account number. The payment account number also can have a conventional VISA or Mastercard format. Preferably, at least the first four digits of the credit and debit account number refer to a bank identification number (BIN).

As discussed above, the bank identification number for debit account 35 is preferably not printed on payment card 15. However, the first four digits of debit account 35 and payment account 45 are the same. A merchant or store handling a redemption from debit account 35 can utilize the first four digits from the credit card number with the remaining numbers printed on the back of card 15 to complete the number for debit account 35. Preferably, card 15 has the same expiration date for debit account 35 and payment account 45.

By printing the debit account number for debit account 35 on the back of card 15, the bank is able to obscure the fact that payment card 15 includes an active debit card number. Card 15 can also include payment account number for account 45 and the debit account number for debit account 35 encoded on a single magnetic strip or on separate magnetic strips.

In addition, other account numbers can be added to card 15. According to an alternative embodiment, card 15 can have the entire debit card account number for account 35 printed or embossed on card 15.

In operation, system 10 advantageously eases redemption from debit account 35 for both a dealer and customer. Payment card 15 allows the customer to carry a single card for both accounts 35 and 45 and allows the dealer to process the account through the same network 55 and point of sale device 25 to reach either debit account 35 or payment account 45.

The dealer advantageously can be reimbursed via the same settlement processes utilized for a conventional credit card account, according to one embodiment. According to another embodiment, store personnel can advantageously utilize the same type of point of sale device 25 as it would for an ordinary credit card. In addition, separate settlement procedures are not required for the dealer as settlement can be advantageously combined with other card activity.

Financial system 10 also provides significant advantages with respect to security by allowing authorization restrictions on debit account 35. For example, debit account 35 can have authorization restrictions so that purchases from only specifically identified dealers or groups of dealers are allowed. All other transactions can be declined through network 55 and/or the bank. In one embodiment, card 15 is configured so that no authorization stand-in approvals is allowed.

Financial system 10 leverages already existing infrastructure through network 55 and private label functionality so that no new networks or connections are required at participating redemption dealers. System 10 can also be configured to include additional accounts provided on same integrated rewards card 15. In a preferred embodiment, system 10 is utilized in a co-branding fashion in which debit account 35 is meant to be redeemed at particular stores or with a particular product line.

With reference to FIGS. 2 and 3, a front side 28 of card 15 includes a payment card number (e.g., credit card number) 100. As shown in FIG. 2, number 100 is preferably a 16-digit number with at least the first four digits being the bank identification number. Preferably, number 100 is embossed on the front of the card and the first four digits are also printed on the front of the card at a location 102. Face 28 can also include various indicia of co-branding, such as a dealer's trademark or other indication of the link to a particular type of reward account.

In FIG. 3, a back 200 of card 15 includes a debit card number 205 corresponding to account 35. Debit account number 205 preferably includes only 12 digits. Number 205 preferably does not include a bank identification number. The bank identification number as printed in number 100 or at place 102. The bank identification number can be utilized to complete the debit card number.

The placement of numbers 100, 205 and other indicia is not shown in a limiting fashion. Further, the various other indicia shown in FIGS. 2 and 3 is exemplary only and not shown in a limiting fashion.

Back 200 can include a magnetic strip 208 for including one or both of numbers 100 and 205. In operation, a customer redeems a reward balance from debit account 35 by presenting card 15 to a clerk or merchant and indicating that the customer wants to pay for goods or services with their reward points. The clerk can key enter number 205 into point of sale device 25 or utilize a card swiping process. Alternatively, chip technology in place of magnetic strip technology can be utilized.

After the clerk key enters the debit card number 205 and the transaction amount into point of sale device 25, network 55 is utilized to route the authorization to the issuer of integrated payment and rewards card 15. Preferably, network 55 is the same network used to route authorization for the user of payment account 45. In a preferred embodiment, network 55 is a Visa or Mastercard network that routes authorization to the issuer such as a bank or a partner of a bank, or other institution. Authorization is preferably performed in the same fashion as other credit and debit card authorizations.

When the authorization request is received by the issuer, special authorization rules are preferably implemented in software. The software recognizes that the request is using account number 205 as a special reward redemption authorization. The software confirms that the transaction is occurring at the appropriate merchant via merchant category code (MCC), merchant name, specific terminal, or other ID field information. The transaction amount is compared to the available reward balance in debit account 35 and approve/decline decision is returned to the clerk.

Settlement for the merchant occurs with all other debit or credit card transactions that participating merchant store has done during the day. As point of sale device 25 is settled and closed, the reward transaction is included. Settlement occurs as part of the acquiring functionality and settlement with the cardholder occurs as the transaction posts.

Figure 4:
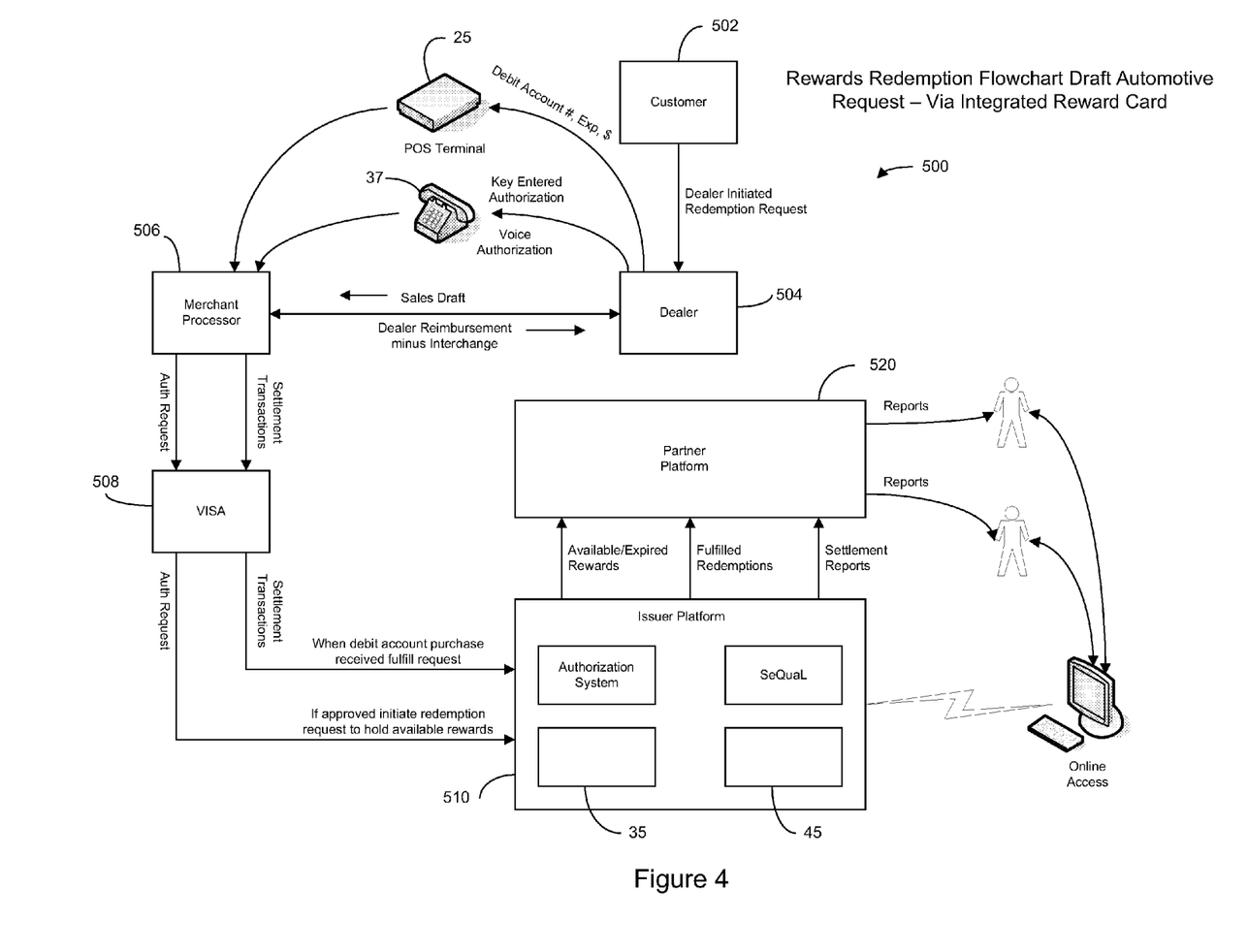
FIG. 4 is a flow diagram depicting an exemplary operation for record redemption in the financial system of FIG. 1.

With reference to FIG. 4, flow diagram 500 provides an automated rewards redemption for a dealer co-sponsored credit or debit card. However, flow diagram 500 and system 10 can be utilized in a non co-branding situation. In diagram 500, a customer or cardholder 502 enters a dealer 504 and requests a redemption from debit account 35.

A clerk at dealer 504 either through voice authorization on telephone 37 or point of sale device 25 enters number 205 from card 15. The clerk includes the missing four digits for a complete account number for debit account 35 which is received at merchant processor 506. The request includes the transaction amount and can also identify the goods or services being purchased.

Merchant processor 506 provides the request through Visa network 508 to a mainframe 510. Mainframe 510 is preferably controlled by the card issuer. Mainframe 510 recognizes number 205 as a special number associated with debit account 35 and authorizes the transaction based upon reward points as opposed to credit lines or other balances cardholder has at the institution associated with a computing platform C (e.g., mainframe 510).

In addition, mainframe 510 can check the expiration date of card 15. Mainframe 510 also tracks the transaction amount. Mainframe 510 can further verify the merchant code, the merchant and the product type to ensure that these factors meet the redemption rules for account 35.

Once the transaction is authorized, award points from debit account 35 are decremented by mainframe 510. Mainframe 510 can be coupled to a mainframe 520 associated with dealer 504. Mainframe 510 can provide reports to mainframe 520. Mainframe 510 can transact with other financial institutions associated with dealer 504.

The customer can also choose to utilize its ordinary credit card number 100 for the transaction. For such a transaction, the clerk runs the process through network 508 to mainframe 510. Mainframe 510 recognizes number 100 as an ordinary credit card transaction or debit card transaction and process the transaction accordingly. Reward points are accumulated in account 35 for purchases made through account 45.

Figure 5:
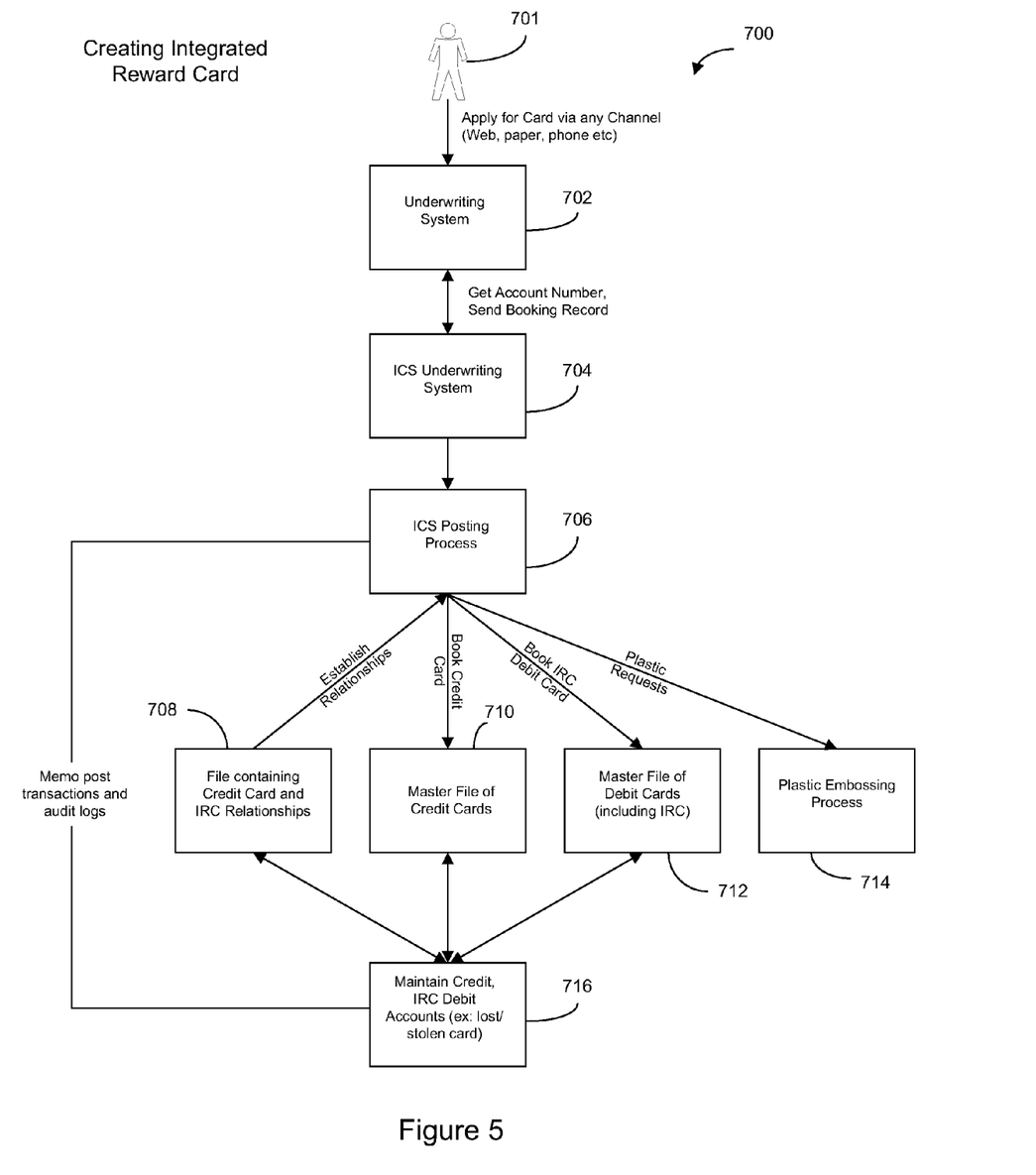
FIG. 5 is a flow diagram depicting an exemplary operation for a customer applying for and being issued an Integrated Reward Card to be processed in the financial system of FIG. 1.

With reference to FIG. 5, a flow diagram 700 shows a process for providing a payment card 15 to a customer 701. At a step 702, underwriting begins. Step 702 can begin in response to an application by customer 701, a web request, phone request, etc. At step 704, an interface with posting process 706 is made. The posting process enables payment card 15 to be utilized according to flow diagram 500.

At a step 708, account 45 is tied to a particular credit/debit card number for account 45 and a debit account number for account 35. The relationship between account 35 and 45 and rewards scheme is also recorded.

At a step 710, the credit card is booked to a master file of credit cards for the credit card issuer (e.g., bank). At a step 712, account 35 is booked in a master file of debit cards for the card issuer (e.g., bank). At a step 714, the plastic credit card is produced as payment card 15.

At a step 716, maintenance associated with account 35 and 45 is performed (e.g., lost and stolen credit cards). Maintenance also includes maintaining accounts 35 and 45 in response to transactions and audit logs.

Figure 6:
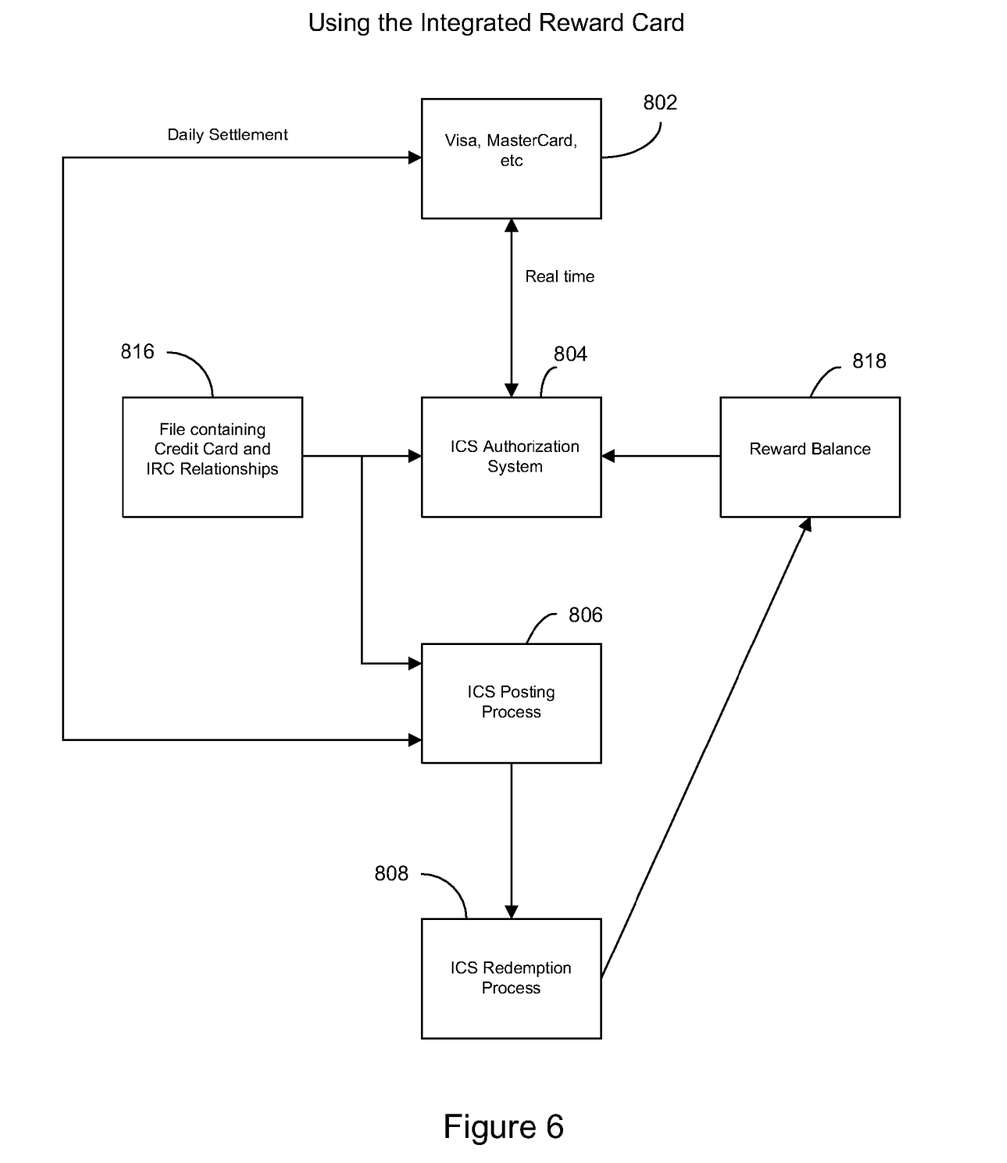
FIG. 6 is a flow diagram depicting an exemplary operation a customer using an Integrated Reward Card in the financial system of FIG. 1.

In FIG. 6, a flow diagram 800 generically shows the use of payment card 15. A request comes from Visa, MasterCard, Discover or any credit card institution 802 to the credit card issuer's authorization system 804. System 804 obtains a file 816 associated with payment card 15 and accounts 35 and 45. File 816 contains information about account 45 and 35 and payment card 15. Preferably communication between a credit card institution 802 and system 804 is a real time or near real time transaction.

System 804 communicates with a posting process system 806. Posting process system 806 also receives daily settlement information from credit card institution 802. System 806 communicates with a redemption system 808 which calculates reward balances are stored in file 818. Authorization system 804 utilizes file 818 to determine if account 35 has enough points or other rewards for a purchase using account 35. Daily settlement information is communicated between institution 802 and system 806.

While several embodiments of the invention have been described, it is to be understood that modifications and changes will occur to those skilled in the art to which the invention pertains. For example, although the term "banking" is used to desire the financial system 10, the system is not limited to operation by a bank or credit union. Any entity could provide the financial system 10. System 10 can utilize co-branding in any field including but not limited to automobile manufacturers, airlines, clothing stores, restaurants, electronic stores, grocery stores, etc. Accordingly, the claims appended to this specification are intended to define the invention precisely.

What is claimed is:

1. An integrated rewards card, comprising:
a payment card number associated with a payment account of a person, persons, an entity, or a business; and
a debit card number, different than the payment card number, wherein purchases using the payment card number cause a reward balance on a reward account associated with the debit card number to be increased, wherein products or services can be purchased with the reward account using a POS device for the payment card number, wherein the payment card number is embossed on a first face of the card and a portion of the debit card number is a non-embossed number on a second face of the card.

2. The card of claim 1, wherein the payment account and the reward account are maintained by a common institution.

3. The card of claim 1, wherein the payment account and the reward account are maintained by separate entities.

4. The card of claim 1, wherein the payment card number is an encoded number on a magnetic strip.

5. The card of claim 4, comprising a single magnetic strip for accessing both the payment account and the reward account.

6. The card of claim 1, wherein the portion of the debit card number does not include a bank identification number.

7. The card of claim 6, wherein the debit card number is printed on the card.

8. The card of claim 7, wherein the bank identification number is the same for the payment card number and the debit card number.

9. The card of claim 1, wherein the payment card number and debit card number have at least the same first four numbers.

10. The card of claim 9, wherein the at least first four numbers of the debit card number are not written on the card.

11. The card of claim 1, wherein the card is a VISA or Mastercard.

12. The card of claim 1, wherein the payment account is a credit account.

13. A method of procurement using a payment card having a debit card number associated with a first account, wherein the payment card has a second number associated with a second account, wherein use of the second number to purchase goods or services results in an accumulation in the first account, the method comprising:
providing the payment card to a merchant;
determining whether to use the debit card number or the second number to at least partially purchase a good or a service;
using a point of sale device to process the debit card number, the point of sale device being capable of processing the second number for purchases of goods or services; and
consummating a transaction upon receiving verification, wherein a portion of the debit card number is provided on a second side of the payment card and the second number is provided on a first side of the card, the debit card number not including a bank identification number associated with the debit card number.

14. The method of claim 13, wherein the second number is a credit card number.

15. The method of claim 13, wherein a same banking institution is associated with the debit card number and the second number.

16. The method of claim 13, wherein a first four digits of the debit card number are not visible on the card.

17. The method of claim 13, wherein the payment card comprises a single magnetic strip for accessing both the first account and the second account.

18. A financial system, comprising:
an integrated credit/debit reward card including a payment card number associated with a payment account and a debit card number, the debit card number being different than the payment card number, the payment card number being associated with a debit account corresponding to the debit card number, wherein purchases using the payment card number increase the debit account; and
point of sale equipment for processing the payment card number and the debit card number, wherein the payment card number and the debit card number are processed utilizing a same network, wherein a portion of the debit card number is provided on a first face of the card and the payment card number is provided on a second face of the card, wherein the portion does not include a bank identification number and the payment card number includes the bank identification number.

19. The financial system of claim 18, wherein the same network is an open credit card network.

20. The financial system of claim 18, wherein the integrated credit/debit card comprises a single magnetic strip for accessing both the payment account and the debit account.

* * * * *